United States Patent
Nakao et al.

(10) Patent No.: US 9,705,326 B2
(45) Date of Patent: Jul. 11, 2017

(54) POWER CONSUMPTION MODE GUIDING DEVICE AND SYSTEM

(75) Inventors: Kunihiro Nakao, Osaka (JP); Koji Yakire, Osaka (JP); Tomoyuki Hirai, Osaka (JP); Satoshi Nagata, Tokyo (JP)

(73) Assignees: Osaka Gas Co., Ltd., Osaka (JP); Wind Engineering Center Co., Ltd., Tokyo (JP)

(*) Notice: Subject to any disclaimer, the term of this patent is extended or adjusted under 35 U.S.C. 154(b) by 336 days.

(21) Appl. No.: 14/387,125

(22) PCT Filed: Mar. 23, 2012

(86) PCT No.: PCT/JP2012/057522
§ 371 (c)(1),
(2), (4) Date: Feb. 13, 2015

(87) PCT Pub. No.: WO2013/140604
PCT Pub. Date: Sep. 26, 2013

(65) Prior Publication Data
US 2015/0180236 A1    Jun. 25, 2015

(51) Int. Cl.
*H02J 7/04* (2006.01)
*H02J 3/00* (2006.01)
(Continued)

(52) U.S. Cl.
CPC ...... *H02J 3/00* (2013.01); *H02J 3/14* (2013.01); *H02J 3/28* (2013.01); *H02J 3/34* (2013.01);
(Continued)

(58) Field of Classification Search
CPC .. H02J 7/0054; H02J 7/345; H02J 3/00; H02J 3/28; H02J 3/34
(Continued)

(56) References Cited

U.S. PATENT DOCUMENTS

| 2002/0084655 A1* | 7/2002 | Lof | F03D 7/0284 290/44 |
| 2006/0002157 A1* | 1/2006 | Petter | H02J 3/38 363/37 |

(Continued)

FOREIGN PATENT DOCUMENTS

| CA | 2746166 A1 | 9/2010 |
| CN | 101834449 A | 9/2010 |
| CN | 102326315 A | 1/2012 |
| EP | 2224570 A2 | 9/2010 |
| JP | 2002044883 A | 2/2002 |

(Continued)

*Primary Examiner* — Edward Tso
*Assistant Examiner* — Aaron Piggush
(74) *Attorney, Agent, or Firm* — The Webb Law Firm

(57) ABSTRACT

A power consumption mode guiding device includes a local system wherein the frequency of power on an AC line, is controlled at a target frequency determined according to the state of charge of a power storage device. The power consumption mode guiding device includes a frequency detection unit that detects the actual frequency of power on the AC line, an information storage unit in which guidance information for guiding the mode of use of a power consumption device by a power consumer (D) to a prescribed mode are stored in advance in association with frequency information obtained from detection results from the frequency detection unit, and a guidance information output unit that reads out, from the information storage unit, the guidance information associated with the frequency information obtained from the detection result from the frequency detection unit, and outputs the guidance information to the power consumer (D).

6 Claims, 3 Drawing Sheets

(51) Int. Cl.
*H02J 3/28* (2006.01)
*H02J 3/34* (2006.01)
*H02J 7/00* (2006.01)
*H02J 3/14* (2006.01)
*H02J 7/34* (2006.01)
*H02J 1/00* (2006.01)
*H02J 3/24* (2006.01)

(52) U.S. Cl.
CPC ............... *H02J 7/0054* (2013.01); *H02J 1/00* (2013.01); *H02J 3/24* (2013.01); *H02J 7/345* (2013.01); *H02J 2001/002* (2013.01); *Y02P 80/14* (2015.11); *Y10T 307/852* (2015.04)

(58) Field of Classification Search
USPC .................... 320/103, 155, 166; 307/46, 129
See application file for complete search history.

(56) References Cited

U.S. PATENT DOCUMENTS

| | | | |
|---|---|---|---|
| 2010/0090532 A1* | 4/2010 | Shelton | H02J 3/32 307/46 |
| 2010/0138070 A1 | 6/2010 | Beaudoin | |

FOREIGN PATENT DOCUMENTS

| | | |
|---|---|---|
| JP | 2006094578 A | 4/2006 |
| JP | 2007020289 A | 1/2007 |
| JP | 2011019380 A | 1/2011 |
| WO | 2010103650 A1 | 9/2010 |

\* cited by examiner

POWER CONSUMPTION MODE GUIDING DEVICE AND SYSTEM

CROSS-REFERENCE TO RELATED APPLICATION

This application is the United States national phase of International Application No. PCT/JP2012/057522 filed Mar. 23, 2012, the disclosure of which is hereby incorporated in its entirety by reference.

BACKGROUND OF THE INVENTION

Field of the Invention

The present invention relates to a power consumption mode guiding device and system for guiding the mode of use of a power consumption device by a power consumer to a prescribed mode.

Decription of Related Art

When there is a demand for a power consumer to reduce power consumption, there are cases where the reduction in power consumption in response to the demand (a so-called "demand response") is actually performed on the power consumer side. Examples of the demand response include cases where, when the power supply reserve capacity of a power company or the like, which is the power supply side, has decreased due to an increase in power consumption by a power consumer, and the power company or the like demands the power consumer to reduce their power consumption, the power consumer voluntarily reduces their power consumption in response to the power reduction demand, or the power company or the like reduces power consumption by remote control of the power consumption device of the power consumer. In this way, if the power consumer changes their mode of use of a power consumption device to a prescribed mode in response to a demand from the power supply side, it can be said that a demand response has been performed.

Also, a power supply system that has been proposed in the past is constituted by a local system that has an AC line to which multiple power consumers are connected, a power storage device, and a local inverter device that connects the power storage device and the AC line. For example, in the power supply system described in Patent Document 1, linking inverter devices for linking the power storage device of one local system to the AC line of another local system are provided between local systems such that multiple local systems are electrically connected in series. Furthermore, the local inverter devices of the respective local systems perform control such that the voltage of the power on the AC line is at a target voltage, and such that the frequency of the power on the AC line is at a target frequency determined according to the state of charge of the power storage device. In other words, the frequency of the power on the AC line in each local system is a value that reflects the state of charge of the power storage device.

Note that with a power supply system such as that described in Patent Document 1, power is supplied from the power storage device to the AC line, that is to say to the power consumption device of a power consumer, and therefore although a "power company" does not exist, the power storage device can be considered to correspond to the aforementioned "power supply side".

PRIOR ART DOCUMENTS

Patent Documents

Patent Document 1: WO 2010/103650

SUMMARY OF THE INVENTION

If the power supply side demands a power consumer to change their mode of use of a power consumption device (e.g., reduce power consumption), firstly the power supply side needs to determine which mode of use of the power consumption device to demand from the power consumer. In other words, since power consumers themselves cannot be aware in real-time of information on how much power supply reserve capacity the power supply side has, power consumers cannot make determinations such as in which mode their power consumption devices need to be used, and when and to what extent power consumption reduction needs to be performed in order to prevent a power supply shortage or the like. With the power supply system described in Patent Document 1, it is possible for power consumers to be aware of the power supply reserve capacity of the power supply side if a device for detecting the state of charge of the power storage device and communication equipment for communicating the detection result of that device to the power consumers are specially provided.

However, providing such special communication equipment and the like has the problem of a very high rise in cost.

In light of the above-described problems, an object of the present invention is to provide a power consumption mode guiding device and system that can determine a mode of use of a power consumption device and guide the mode of use of the power consumption device by a power consumer to the determined mode.

In a characteristic configuration of a power consumption mode guiding device according to the present invention for achieving the above-described object, the power consumption mode guiding device is provided in a local system that has an AC line to which a power consumption device of a power consumer is connected, a power storage device, and a local inverter device connecting the power storage device and the AC line, and in which the local inverter device performs control such that the voltage of the power on the AC line is at a target voltage, and such that the frequency of the power on the AC line is at a target frequency determined according to the state of charge of the power storage device, the power consumption mode guiding device including:

a frequency detection unit that detects the actual frequency of power on the AC line;

an information storage unit in which a plurality of pieces of guidance information for guiding a mode of use of the power consumption device by the power consumer to a prescribed mode are stored in advance in association with pieces of frequency information obtained from detection results from the frequency detection unit; and a guidance information output unit that reads out, from the information storage unit, the piece of the guidance information that is associated with the piece of frequency information obtained from a detection result from the frequency detection unit, and outputs the piece of guidance information to the power consumer.

According to the above characteristic configuration, due to the local inverter device performing control such that the frequency of power on the AC line is at a target frequency determined according to the state of charge of the power storage device, the frequency of power on the AC line detected by the frequency detection unit is a value in which the state of charge of the power storage device is reflected. In other words, even if the state of charge of the power storage device is not directly monitored on the power consumer side, that is to say even if special communication equipment and the like for directly detecting the state of charge of the power storage device and transmitting the detection result to the power consumer side is not newly provided, the state of charge of the power storage device can be indirectly found out by merely detecting the existing frequency of power on the AC line. The guidance information output unit then reads out, from the information storage unit, the piece of guidance information that is associated with the piece of frequency information obtained from the detection result from the frequency detection unit, and thus the mode of use of the power consumption device that is to be given as guidance is automatically determined. Also, by the guidance information output unit outputting the determined guidance information to the power consumer, the mode of use of the power consumption device by the power consumer can be guided to the prescribed mode that was determined.

In another characteristic configuration of the power consumption mode guiding device according to the present invention, the power consumption mode guiding device includes: a deviation amount calculating unit that compares the actual frequency detected by the frequency detection unit and a reference frequency of the AC line, and calculates a deviation amount of the actual frequency relative to the reference frequency as the frequency information, wherein the plurality of pieces of guidance information are stored in the information storage unit in advance in association with deviation amount magnitudes, and the guidance information output unit reads out, from the information storage unit, the piece of guidance information that is associated with the magnitude of the deviation amount calculated by the deviation amount calculating unit, and outputs the piece of guidance information to the power consumer.

According to the above characteristic configuration, the deviation amount calculating unit compares the actual frequency detected by the frequency detection unit and the reference frequency of the AC line, and calculates the deviation amount of the actual frequency relative to the reference frequency as the frequency information, thus making it possible to indirectly find out whether the state of charge of the power storage device is in a relatively high state or a relatively low state. The guidance information output unit then reads out, from the information storage unit, the piece of the guidance information that is associated with the magnitude of the deviation amount calculated by the deviation amount calculating unit, and thus the mode of use of the power consumption device that is to be given as guidance is automatically determined. Also, by the guidance information output unit outputting the determined guidance information to the power consumer, the mode of use of the power consumption device by the power consumer can be guided to the prescribed mode that was determined.

In yet another characteristic configuration of the power consumption mode guiding device according to the present invention, the guidance information output unit outputs the guidance information to the power consumer using at least one of audio and text.

According to the above characteristic configuration, the guidance information is output to the power consumer using at least one of audio and text, thus making it possible to reliably allow the power consumer to become aware of the guidance information. As a result, the mode of use of the power consumption device by the power consumer can be guided to the prescribed mode that was determined.

In still another characteristic configuration of the power consumption mode guiding device according to the present invention, the guidance information output unit outputs the guidance information to the power consumer as information for controlling power consumption in the power consumption device.

According to the above characteristic configuration, the guidance information is output to the power consumer as information for controlling the power consumption in the power consumption device, thus making it possible to reliably control the operation of the power consumption device so as to be in a mode that corresponds to the guidance information. As a result, the mode of use of the power consumption device by the power consumer can be guided to the prescribed mode that was determined.

In a characteristic configuration of a power consumption mode guiding system according to the present invention, the power consumption mode guiding system includes: a plurality of local systems provided with the power consumption mode guiding device, wherein a linking inverter device that connects the power storage device of one local system to the AC line of another local system is provided between local systems such that the plurality of local systems are electrically connected in series, and with respect to two local systems that are adjacent to each other and electrically connected via one linking inverter device, the one linking inverter device performs electric power transmission such that power is transmitted from the local system in which the state of charge of the power storage device is relatively higher to the local system in which the state of charge of the power storage device is relatively lower, based on the target frequencies determined according to the states of charge of the power storage devices.

According to the above characteristic configuration, electric power transmission is performed such that power is transmitted from the local system in which the state of charge of the power storage device is relatively higher to the local system in which the state of charge of the power storage device is relatively lower, thus making it possible to equalize the state of charge of the power storage device among the local systems.

In another characteristic configuration of the power consumption mode guiding system according to the present invention, in each of the local systems, the local inverter device calculates the target frequency by adding a frequency variation component determined by a function of the state of charge of the power storage device to a reference frequency of the AC line, and a relational expression between the state of charge and the frequency variation component is set separately in each of the local systems.

According to the above characteristic configuration, the relational expression between the state of charge and the frequency variation component is set separately in each of the local systems, and therefore even if the states of charge of the power storage devices of multiple local systems are the same, it is possible for the frequency of power on the AC line of one local system and the frequency of power on the AC line of another local system to be set differently. As a result, even if the state of charge of the power storage device of one local system and the state of charge of the power storage device of another local system are the same, different guidance information can be presented to the power consumers of the respective local systems.

DESCRIPTION OF THE INVENTION

First Embodiment

Figure 1:
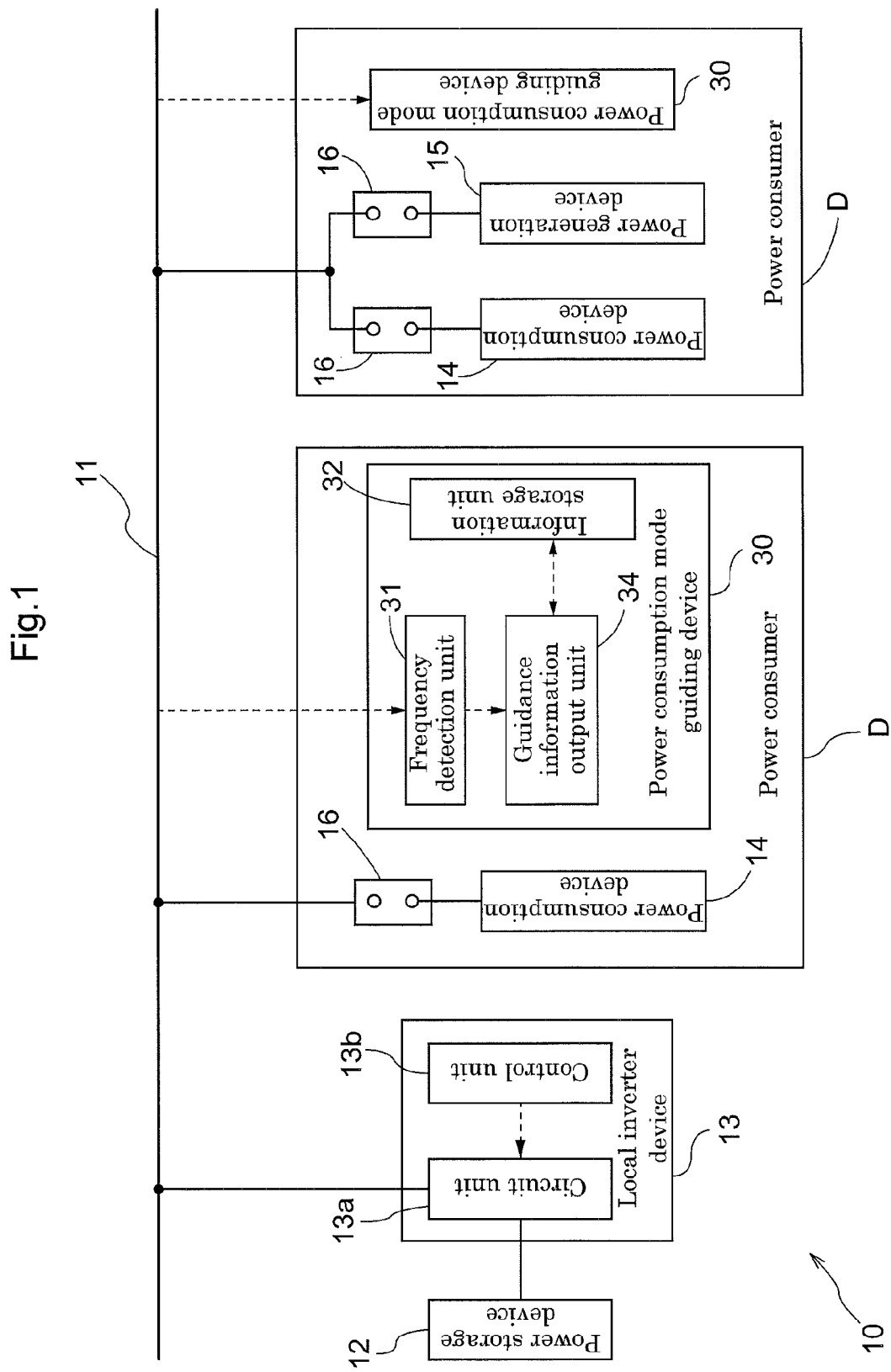
FIG. 1 is a diagram illustrating a configuration of a power consumption mode guiding device according to a first embodiment.

The following describes a power consumption mode guiding device of a first embodiment. FIG. 1 is a diagram illustrating the configuration of the power consumption mode guiding device of the first embodiment and the configuration of a local system 10 in which the power consumption mode guiding device is provided.

As shown in FIG. 1, the local system 10 has an AC line 11 to which multiple power consumers D are connected, a power storage device 12, and a local inverter device 13 that connects the power storage device 12 and the AC line 11.

Each power consumer D has a power consumption device 14 that consumes power supplied from the AC line 11. Alternatively, each power consumer D may have a power generation device 15 in addition to the power consumption device 14. Various devices can be used as the power generation device 15, such as a solar power generator or a wind power generator, which generate power using natural energy such as sunlight or wind, or a fuel cell that generates power using fuel. Note that the number of power consumption devices 14 and power generation devices 15 and the combination thereof included in the power consumers D are not limited to the illustrated example, and can be changed as appropriate.

Various devices can be used as the power storage device 12, such as a storage battery (e.g., a chemical cell) or an electrical double layer capacitor.

The local inverter device 13 is constituted by, for example, a circuit unit 13a that has a semiconductor switch and the like, and a control unit 13b that controls the switching operation of the semiconductor switch. The local inverter device 13 performs control such that the voltage of the power on the AC line 11 is at a target voltage, and such that the frequency of the power on the AC line 11 is at a target frequency determined according to the state of charge of the power storage device 12. For example, in the present embodiment, the local inverter device 13 performs control such that the frequency of the power on the AC line 11 is at a target frequency determined by a relationship in which the frequency rises as the state of charge of the power storage device 12 increases. As one example of an expression for this relationship, the target frequency is a value obtained by adding the frequency variation component determined by a function of the state of charge of the power storage device 12 (e.g., a relationship in which the frequency variation component increases as the state of charge increases) to the reference frequency of the AC line 11 (e.g., 60 Hz). In this case, the relationship between the target frequency f, the reference frequency f0, and the frequency variation component Δf can be expressed by Expression 1 below. Also, using the state of charge [SOC] and constants A and B, the frequency variation component Δf can be expressed by Expression 2 below.

$$f = f0 + \Delta f \quad \text{(Exp. 1)}$$

$$\Delta f = A \times [SOC] + B \quad \text{(Exp. 2)}$$

The control unit 13b of the local inverter device 13 stores the above relational expressions, according to which the target frequency of the AC line 11 increases as the state of charge of the power storage device 12 increases, in advance in an internal memory or the like, and the control unit 13b of the local inverter device 13 performs control in accordance with these relational expressions. In this way, the state of charge of the power storage device 12 connected to the AC line 11 via the local inverter device 13 is reflected in the actual frequency (i.e., target frequency) of that AC line 11.

Next, the configuration of a power consumption mode guiding device 30 of the present embodiment will be described.

As shown in FIG. 1, the power consumption mode guiding device 30 includes a frequency detection unit 31, an information storage unit 32, and a guidance information output unit 34.

The frequency detection unit 31 detects the actual frequency of the power on the AC line 11. As described above, the state of charge of the power storage device 12 connected to the AC line 11 via the local inverter device 13 is reflected in the actual frequency of the power on the AC line 11. For example, if the local inverter device 13 performs control such that the frequency of the power on the AC line 11 is at a target frequency determined by a relationship in which the frequency rises as the state of charge of the power storage device 12 increases, then the higher the actual frequency detected by the frequency detection unit 31 is, the higher the state of charge of the power storage device 12 is.

Multiple pieces of guidance information, which are for guiding the mode of use of a power consumption device 14 by a power consumer D to a prescribed mode, are stored in the information storage unit 32 in advance in association with pieces of frequency information obtained from detection results from the frequency detection unit 31. The present embodiment takes the example of the case where the frequency information obtained from detection results from the frequency detection unit 31 is actual frequency values.

In the present description, guiding the mode of use of a power consumption device 14 by a power consumer D to a prescribed mode refers to giving guidance such that the power consumer D uses the power consumption device 14 in an unplanned mode, and examples of this include giving guidance such that the power consumption of the power consumption device 14 relatively decreases or increases due to stopping or starting operation of the power consumption device 14 at an unplanned timing, and giving guidance such that the power consumption of the power consumption device 14 relatively decreases or increases due to changing the operation time period of the power consumption device 14 to a time period different from the originally planned time period.

The guidance information output unit 34 reads out, from the information storage unit 32, the piece of guidance information that is associated with the piece of frequency information obtained from the detection result from the frequency detection unit 31, and outputs the piece of guidance information to a power consumer D.

For example, the guidance information output unit 34 can be constituted using, for example, a display device or an audio output device such as a speaker. In this case, the guidance information is at least one of audio information and text information. The guidance information is then output to the power consumer using at least one of audio and text by a display device, a speaker, or the like serving as the guidance information output unit 34.

Alternatively, the guidance information output unit 34 can be constituted using a device that outputs a command that can cause the power consumption in a power consumption device 14 to be changed. In this case, examples of guidance information that can cause the power consumption of a power consumption device 14 to be changed include control information given directly to the power consumption device 14, and control information given to a breaker 16 provided between the AC line 11 and the power consumption device 14. In other words, there are cases where the power consumption of a power consumption device 14 is changed by outputting control information to the power consumption device 14, cases where the power consumption of a power consumption device 14 is changed as a result of outputting control information to a breaker 16 provided between the AC line 11 and the power consumption device 14 such that the power supply itself to the power consumption device 14 is changed, and the like.

Table 1 below shows examples of combinations of frequency values (frequency information) and pieces of guidance information (in the example of the case where the guidance information is audio information or text information presented to the power consumer D) stored in the information storage unit 32. Specifically, if the actual frequency detected by the frequency detection unit 31 is less than 59.7 (Hz), the guidance information "Reduce power consumption" is output by the guidance information output unit 34 so as to recommend a reduction in power consumption. If the actual frequency is 59.7 (Hz) or more and less than 59.9 (Hz), the guidance information "Available power has slightly decreased" is output by the guidance information output unit 34 so as to allow the power consumer D to become aware of the fact that the amount of available power has decreased. If the actual frequency is 59.9 (Hz) or more and less than 60.1 (Hz), guidance for changing the mode of use of the power consumption device 14 by the power consumer D is not given. If the actual frequency is 60.1 (Hz) or more and less than 60.3 (Hz), the guidance information "Available power has slightly increased" is output by the guidance information output unit 34 so as to allow the power consumer D to become aware of the fact that the amount of available power has increased. If the actual frequency is 60.3 (Hz) or more, the guidance information "Increase power consumption" is output by the guidance information output unit 34 so as to recommend an increase in power consumption.

TABLE 1

| Detected frequency | Guidance information (audio information, text information) |
| --- | --- |
| less than 59.7 (Hz) | "Reduce power consumption" |
| 59.7 (Hz) or more to less than 59.9 (Hz) | "Available power has slightly decreased" |
| 59.9 (Hz) or more to less than 60.1 (Hz) | (No guidance) |
| 60.1 (Hz) or more to less than 60.3 (Hz) | "Available power has slightly increased" |
| 60.3 (Hz) or more | "Increase power consumption" |

Alternatively, if the guidance information is information for controlling the power consumption in the power consumption device 14, the guidance information output unit 34 outputs control information to the power consumption device 14, a breaker 16, or the like. To give a specific example, if a power consumer D has multiple sets of a power consumption device 14 and a breaker 16 connected to the AC line 11 unlike the example shown in FIG. 1, breakers 16 that are to be given control information, which for example indicates the breaker 16 that is to block the power supply if the actual frequency is 59.7 (Hz) or more and less than 59.9 (Hz) or the breaker 16 that is to block the power supply if the actual frequency is less than 59.7 (Hz), are determined in advance and stored in the information storage unit 32 in association with pieces of frequency information obtained from detection results from the frequency detection unit 31. The guidance information output unit 34 then reads out, from the information storage unit 32, the piece of guidance information that is associated with the piece of frequency information obtained from the detection result from the frequency detection unit 31, and outputs the piece of guidance information to a power consumer D. As a result, the breaker 16 then performs a power supply blocking operation so as to stop the supply of power to the power consumption device 14, and thus the power consumption in the power consumption device 14 can be reduced. Also, power consumption devices 14 that are to be given control information, which for example indicates the power consumption device 14 in which power consumption is to be reduced if the actual frequency is 59.7 (Hz) or more and less than 59.9 (Hz) or the power consumption device 14 in which power consumption is to be reduced if the actual frequency is less than 59.7 (Hz), are determined in advance and stored in the information storage unit 32 in association with pieces of frequency information obtained from detection results from the frequency detection unit 31. The guidance information output unit 34 then reads out, from the information storage unit 32, the piece of guidance information that is associated with the piece of frequency information obtained from the detection result from the frequency detection unit 31, and outputs the piece of guidance information to the power consumer D. As a result, the breakers 16 or the power consumption devices 14 operate in accordance with the control information, and the mode of use of the power consumption devices 14 by the power consumers D can be guided to a prescribed mode.

As described above, due to the local inverter device 13 performing control such that the frequency of the power on the AC line 11 is at a target frequency determined according to the state of charge of the power storage device 12, the frequency of the power on the AC line 11 detected by the frequency detection unit 31 is a value in which the state of charge of the power storage device 12 is reflected. In other words, even if the state of charge of the power storage device 12 is not directly monitored on the power consumer D side, that is to say even if special communication equipment and the like for directly detecting the state of charge of the power storage device 12 and transmitting the detection result to the power consumer D side is not newly provided, the state of charge of the power storage device 12 can be indirectly found out by merely detecting the existing frequency of the power on the AC line 11. The guidance information output unit 34 then reads out, from the information storage unit 32, the piece of guidance information that is associated with the piece of frequency information obtained from the detection result from the frequency detection unit 31, and thus the mode of use of the power consumption device 14 that is to be given as guidance is automatically determined. Also, by the guidance information output unit 34 outputting the determined guidance information to the power consumer D, the mode of use of the power consumption device 14 by the power consumer D can be guided to the prescribed mode that was determined.

Second Embodiment

A power consumption mode guiding device of a second embodiment is different from the power consumption mode guiding device described in the first embodiment with respect to the content of the frequency information. The power consumption mode guiding device of the second embodiment will be described below, but descriptions will not be given for configurations similar to those in the first embodiment.

Figure 2:
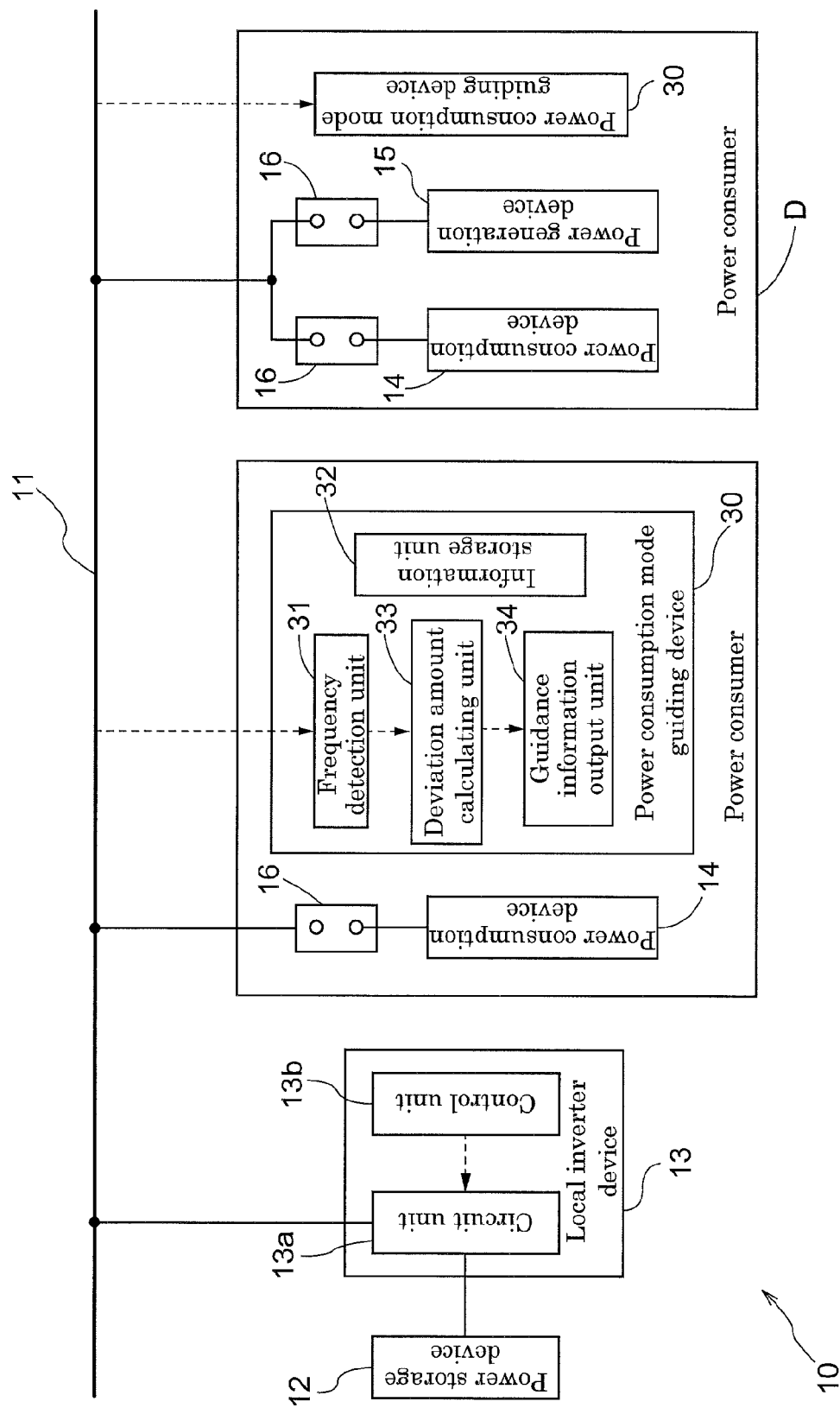
FIG. 2 is a diagram illustrating a configuration of a power consumption mode guiding device according to a second embodiment.

FIG. 2 is a diagram illustrating the configuration of the power consumption mode guiding device 30 of the second embodiment and the configuration of the local system 10 in which the power consumption mode guiding device 30 is provided. The power consumption mode guiding device 30 of the second embodiment includes a deviation amount calculating unit 33 that compares the actual frequency detected by the frequency detection unit 31 with the reference frequency of the AC line 11, and calculates the deviation amount of the actual frequency relative to the reference frequency as the frequency information. Specifically, the case where the frequency information obtained from the detection result from the frequency detection unit 31 is an actual frequency value is described in the first embodiment, but in the second embodiment, the frequency information obtained from the detection result from the frequency detection unit 31 is the deviation amount of the actual frequency relative to the reference frequency, which is calculated by the deviation amount calculating unit 33. Also, multiple pieces of guidance information are stored in the information storage unit 32 in advance in association with deviation amount magnitudes, and the guidance information output unit 34 reads out, from the information storage unit 32, the piece of guidance information that is associated with the magnitude of the deviation amount calculated by the deviation amount calculating unit 33, and outputs the piece of guidance information to the power consumer D.

Table 2 below shows examples of combinations of deviation amounts of the actual frequency relative to the reference frequency (frequency information) and pieces of guidance information stored in the information storage unit 32.

TABLE 2

| Deviation amount relative to reference frequency | Guidance information (audio information, text information) |
|---|---|
| less than −0.3 (Hz) | "Reduce power consumption" |
| −0.3 (Hz) or more to less than −0.1 (Hz) | "Available power has slightly decreased" |
| −0.1 (Hz) or more to less than +0.1 (Hz) | |
| +0.1 (Hz) or more to less than +0.3 (Hz) | "Available power has slightly increased" |
| +0.3 (Hz) or more | "Increase power consumption" |

Also, similarly to the first embodiment, in the case where the guidance information is information for controlling the power consumption in the power consumption device 14 as well, the guidance information output unit 34 reads out the piece of guidance information that is stored in advance in the information storage unit 32 in association with the magnitude of the deviation amount of the actual frequency relative to the reference frequency, and outputs the piece of guidance information to the power consumption device 14, the breaker 16, or the like. As a result, the power consumption devices 14 and the breakers 16 operate in accordance with the control information, and the mode of use of the power consumption devices 14 by the power consumers D can be guided to a prescribed mode.

Third Embodiment

The following describes a power consumption mode guiding system that includes the power consumption mode guiding devices 30 described in the first embodiment and the second embodiment.

Figure 3:
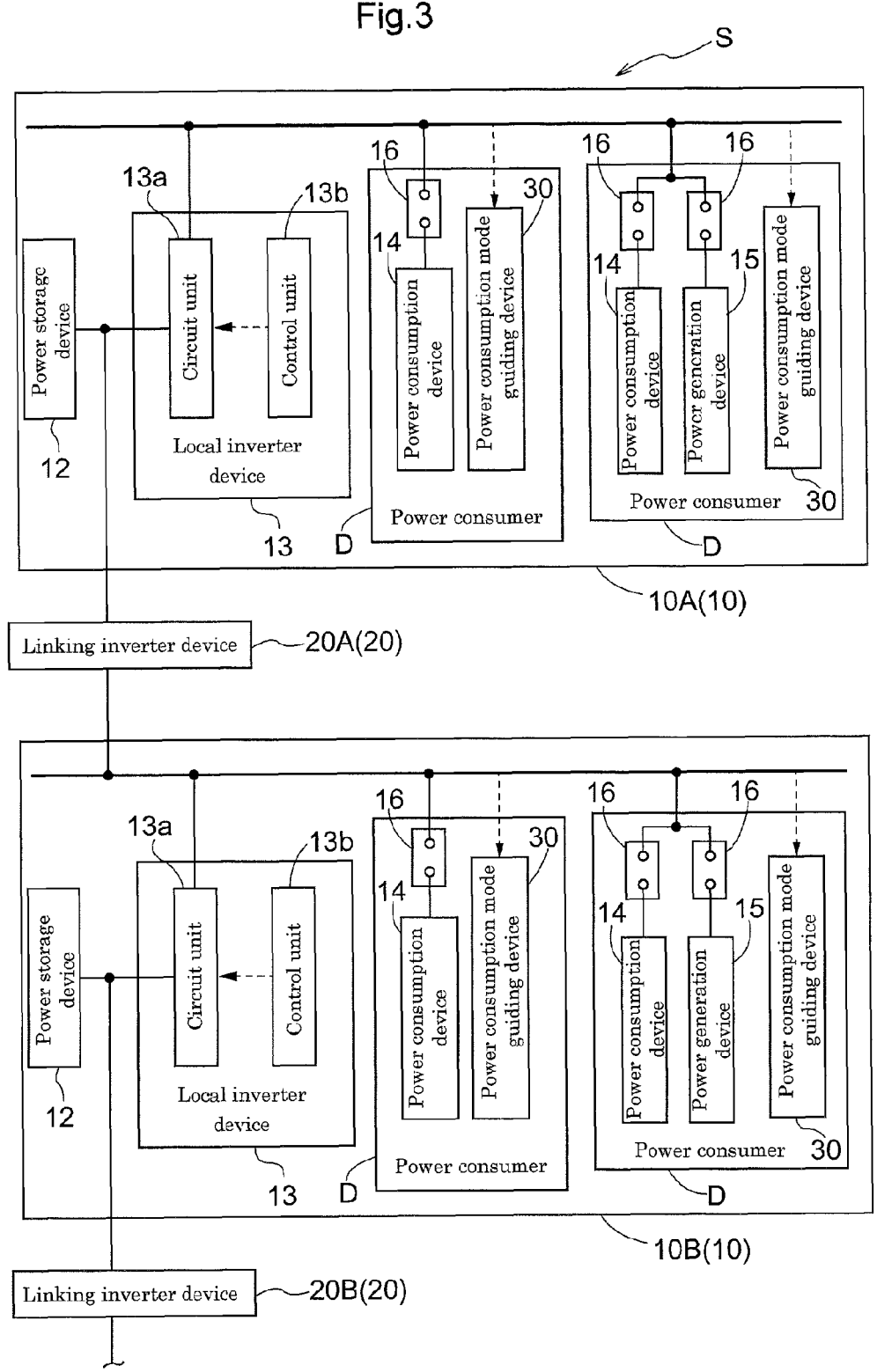
FIG. 3 is a diagram illustrating a configuration of a power consumption mode guiding system.

FIG. 3 is a diagram illustrating the configuration of a power consumption mode guiding system.

A power consumption mode guiding system S includes multiple local systems 10 that are each provided with power consumption mode guiding devices 30, and linking inverter devices 20 for connecting the power storage device 12 of one local system 10 to the AC line 11 of another local system 10 are provided between local systems 10 such that the local systems 10 are electrically connected in series. The configuration of each local system 10 is similar to the configuration described in the first embodiment or the second embodiment. Also, with respect to two local systems 10 that are adjacent to each other and electrically connected via one linking inverter device 20, the one linking inverter device 20 performs electric power transmission such that power is transmitted from the local system 10 in which the state of charge of the power storage device 12 is relatively higher to the local system 10 in which the state of charge of the power storage device 12 is relatively lower, based on the target frequencies determined according to the states of charge of the power storage devices 12.

Specifically, the linking inverter device 20 connects the power storage device 12 of one local system 10A to the AC line 11 of another local system 10B such that the local systems 10 are electrically connected in series. In both the local systems 10A and 10B, the local inverter device 13 performs control such that the frequency of the power on the AC line 11 is at a target frequency determined by a relationship in which the frequency rises as the state of charge of the power storage device 12 increases. As a result, the linking inverter device 20 acquires information regarding the target frequencies determined by the local systems 10A and 10B and operates so as to supply power from the local system 10 having the higher target frequency to the local system 10 having the lower target frequency, and thus electric power transmission is performed such that power is transmitted from the local system 10 in which the state of charge of the power storage device 12 is relatively higher to the local system 10 in which the state of charge of the power storage device 12 is relatively lower. Here, the information regarding the target frequencies acquired by the linking inverter device 20 may be values obtained by detecting the actual frequencies of the power (=target frequencies) on the AC lines 11 in the local systems 10A and 10B, or may be values transmitted from the local inverter devices 13 that determine the target frequencies.

Also, similarly to the first and second embodiments, in each of the local systems 10, the local inverter device 13 calculates the target frequency by adding the above-described frequency variation component determined by a function of the state of charge of the power storage device 12 to the reference frequency of the AC line 11. Here, the relational expression between the state of charge and the frequency variation component is set separately in each of the local systems 10. For example, the values of the constants A and B in the above-described Expression 2 are set separately in each of the local systems 10. Each local inverter device 13 performs control such that the voltage of the power on the AC line 11 is at a target voltage, and such that the frequency of the power on the AC line 11 is at the target frequency.

In this case, even if the state of charge of the power storage device 12 of the local system 10A and the state of charge of the power storage device 12 of the local system 10B are the same, there are cases where the frequency variation components Δf calculated from Expression 2 are different from each other. In other words, even if the state of charge of the power storage device 12 of the local system 10A and the state of charge of the power storage device 12 of the local system 10B are the same, there are cases where the frequency of the power on the AC line 11 of the local system 10A and the frequency of the power on the AC line 11 of the local system 10B are different. As a result, even if the state of charge of the power storage device 12 of the local system 10A and the state of charge of the power storage device 12 of the local system 10B are the same, there is the possibility of different guidance being given, such as guidance information for recommending a reduction in power consumption being presented to the power consumer D in the local system 10A, and guidance for changing the mode of use of the power consumption device 14 by the power consumer D not being given in the local system 10B. In other words, since the relational expression between the state of charge and the frequency variation component is set separately in each of the local systems 10, the manner of giving guidance on the power consumption mode to the power consumer D can be different for each local system 10.

Other Embodiments (1)

Although specific examples of guidance information are described using Table 1, Table 2, and the like in the above embodiments, such guidance information is provided for illustrative purposes and can be changed as appropriate. For example, guidance information for increasing (or decreasing) the generated output of the power generation device 15 may be output to the power consumer D instead of guidance information for decreasing (or increasing) the power consumption of the power consumption device 14.

(2)

Although specific examples of the configuration of the power consumption mode guiding device 30 and the configuration of the power consumption mode guiding system S are given in the above embodiments, these configurations can be changed as appropriate.

For example, the number of power consumption devices 14 and power generation devices 15 and the combination thereof included in the power consumers D are not limited to the illustrated examples, and can be changed as appropriate.

Also, although a power consumption mode guiding system S configured so as to include multiple local systems 10 that are each provided with power consumption mode guiding devices 30 is described in the above third embodiment, the power consumption mode guiding system may be configured so as to include one local system 10 provided with power consumption mode guiding devices 30.

Furthermore, one or both of the constants A and B may be variable(s) in Expression 2 used when the local inverter devices 13 in the power consumption mode guiding system S calculate the frequency variation component Δf. For example, one or both of the numbers A and B may be a function of time. In particular, if the numbers A and B are set such that Δf is lower in a time period in which the total power consumption by multiple power consumers D is high (e.g., daytime in the summer, or the morning and night in winter) than in other time periods, the frequency f of the power on the AC line 11 will be lower in the time period in which the total power consumption is high. As a result, the mode of use of the power consumption devices 14 by the power consumers D can be guided to a mode in which the power consumption by the power consumers D is suppressed as in the examples shown in Table 1, Table 2, and the like.

The present invention is applicable to a power consumption mode guiding device and system that can guide the mode of use of a power consumption device by a power consumer.

The invention claimed is:

1. A power consumption mode guiding device provided in a local system that has an AC line to which a power consumption device of a power consumer is connected, a power storage device, and a local inverter device connecting the power storage device and the AC line, the power consumption mode guiding device comprising a frequency detection unit that detects the actual frequency of power on the AC line, wherein the local inverter device performs control such that the voltage of the power on the AC line is at a target voltage, and such that the frequency of the power on the AC line is at a target frequency calculated by adding a frequency variation component determined by a function of the state of charge of the power storage device to a reference frequency of the AC line, the power consumption mode guiding device further comprising:

an information storage unit wherein a plurality of pieces of guidance information are stored in advance in association with pieces of frequency information obtained from detection results from the frequency detection unit, the guidance information being provided for giving guidance such that the power consumption of the power consumption device decreases or increases; and a guidance information output unit that reads out, from the information storage unit, the piece of the guidance information that is associated with the piece of frequency information obtained from a detection result from the frequency detection unit, and outputs the piece of guidance information to the power consumer.

2. The power consumption mode guiding device according to claim 1, comprising:

a deviation amount calculating unit that compares the actual frequency detected by the frequency detection unit and a reference frequency of the AC line, and calculates a deviation amount of the actual frequency relative to the reference frequency as the frequency information, wherein the plurality of pieces of guidance information are stored in the information storage unit in advance in association with deviation amount magnitudes, and the guidance information output unit reads out, from the information storage unit, the piece of guidance information that is associated with the magnitude of the deviation amount calculated by the deviation amount calculating unit, and outputs the piece of guidance information to the power consumer.

3. The power consumption mode guiding device according to claim 1, wherein the guidance information output unit outputs the guidance information to the power consumer using at least one of audio and text.

4. The power consumption mode guiding device according to claim 1, wherein the guidance information output unit outputs the guidance information to the power consumer as information for controlling power consumption in the power consumption device.

5. A power consumption mode guiding system comprising:
a plurality of local systems provided with the power consumption mode guiding device according to claim 1,
wherein a linking inverter device that connects the power storage device of one local system to the AC line of another local system is provided between local systems such that the plurality of local systems are electrically connected in series, and
with respect to two local systems that are adjacent to each other and electrically connected via one linking inverter device, the one linking inverter device performs electric power transmission such that power is transmitted from the local system in which the state of charge of the power storage device is relatively higher to the local system in which the state of charge of the power storage device is relatively lower, based on the target frequencies determined according to the states of charge of the power storage devices.

6. The power consumption mode guiding system according to claim 5,
wherein in each of the local systems, the local inverter device calculates the target frequency by adding a frequency variation component determined by a function of the state of charge of the power storage device to a reference frequency of the AC line, and
a relational expression between the state of charge and the frequency variation component is set separately in each of the local systems.

* * * * *